Dec. 16, 1924.     1,519,213
A. MOORE
COMPRESSED GASEOUS FLUID BRAKE
Filed May 9, 1922     4 Sheets-Sheet 1
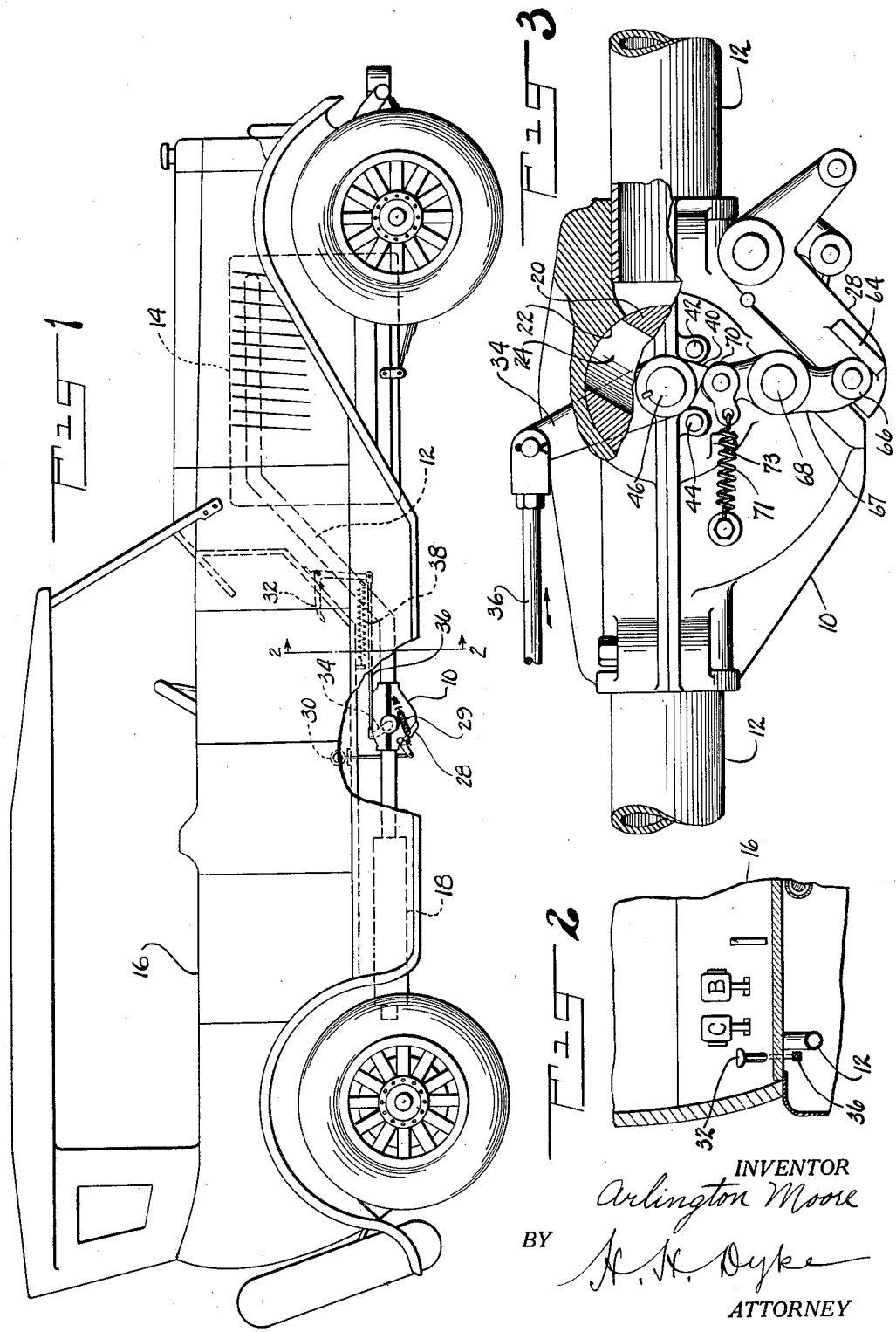
INVENTOR
Arlington Moore
BY
H. H. Dyke
ATTORNEY

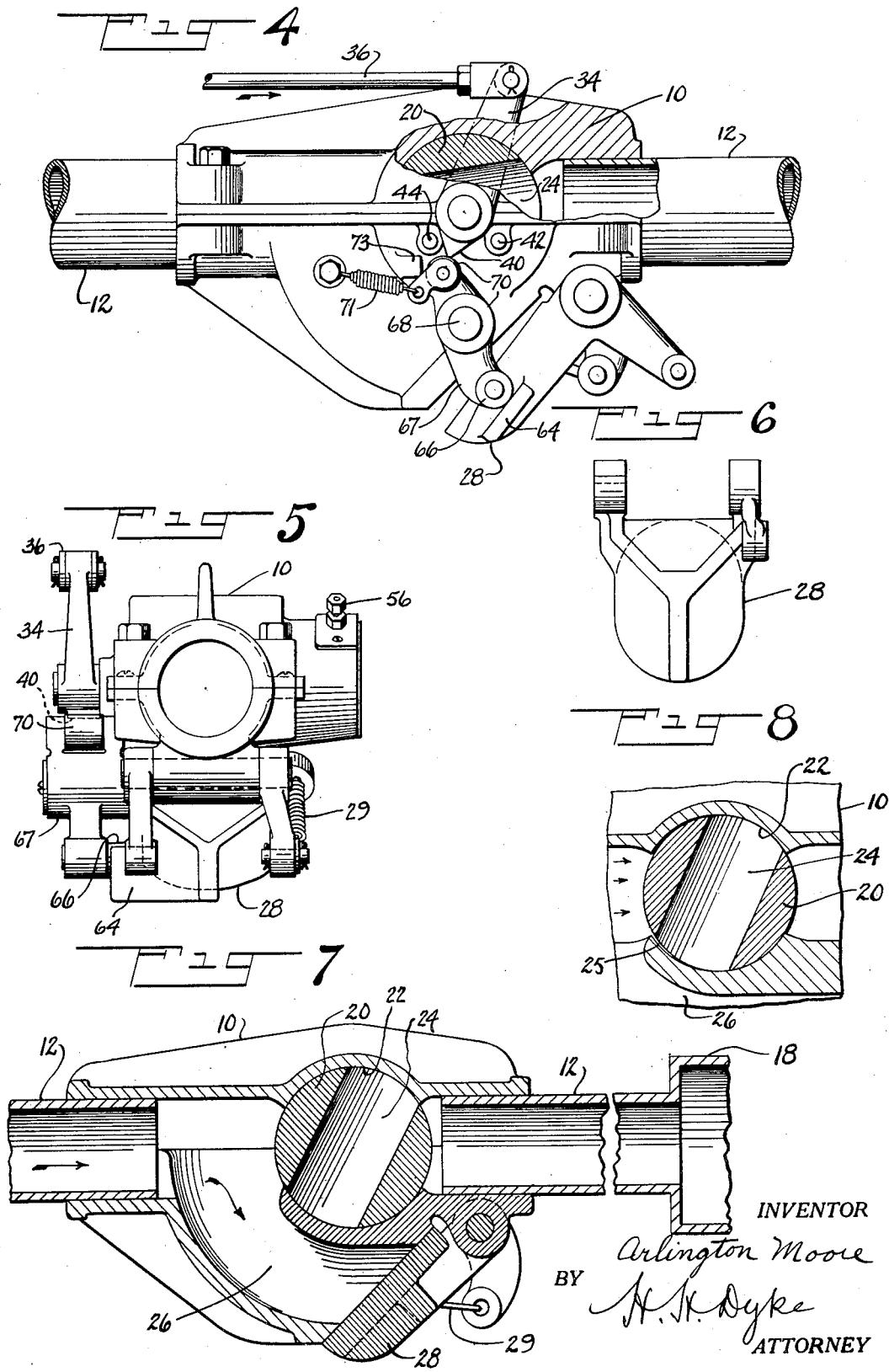

Dec. 16, 1924.
A. MOORE
1,519,213
COMPRESSED GASEOUS FLUID BRAKE
Filed May 9, 1922    4 Sheets-Sheet 3
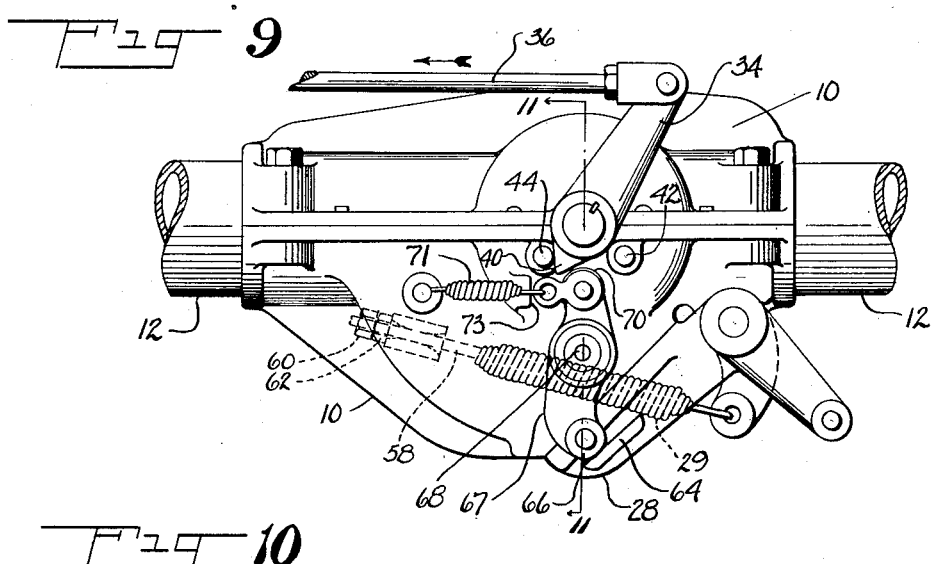
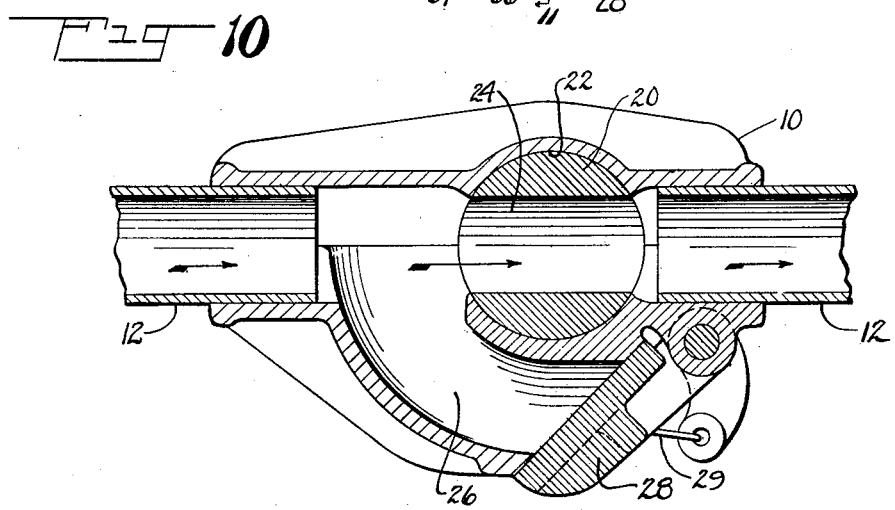
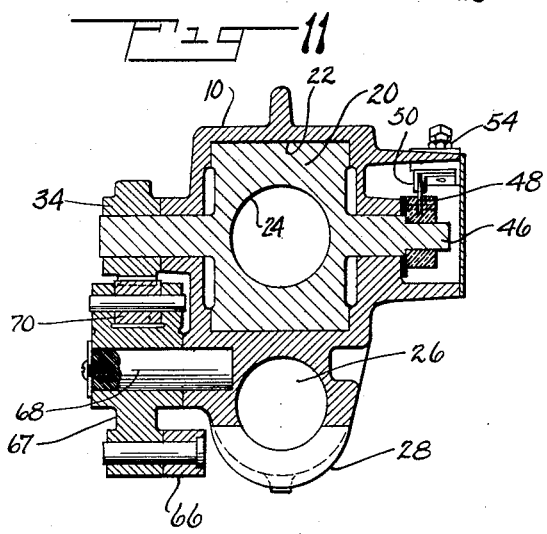
INVENTOR
Arlington Moore
BY H. H. Dyke
ATTORNEY Dec. 16, 1924.
A. MOORE
1,519,213
COMPRESSED GASEOUS FLUID BRAKE
Filed May 9, 1922    4 Sheets-Sheet 4
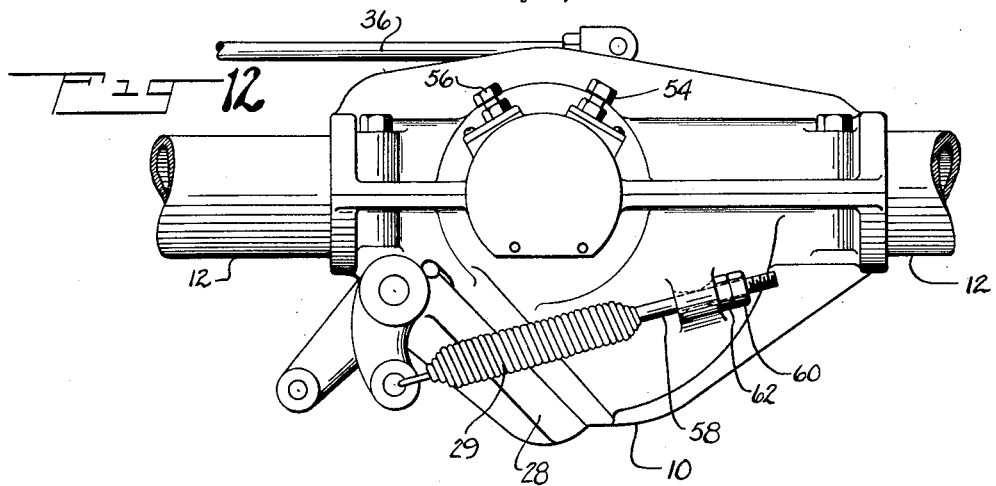
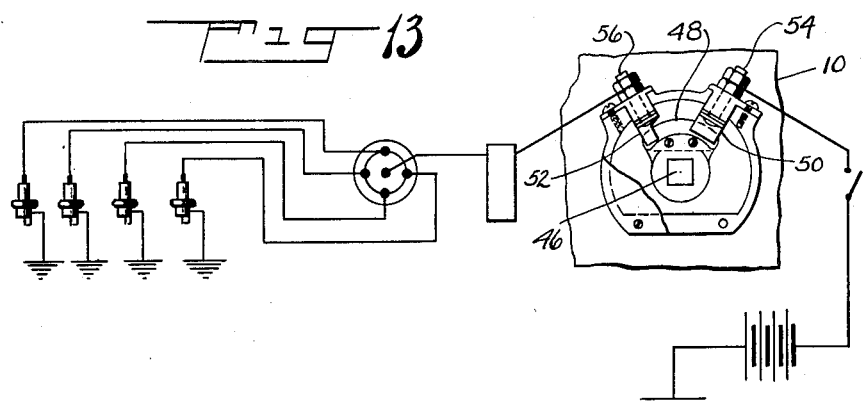
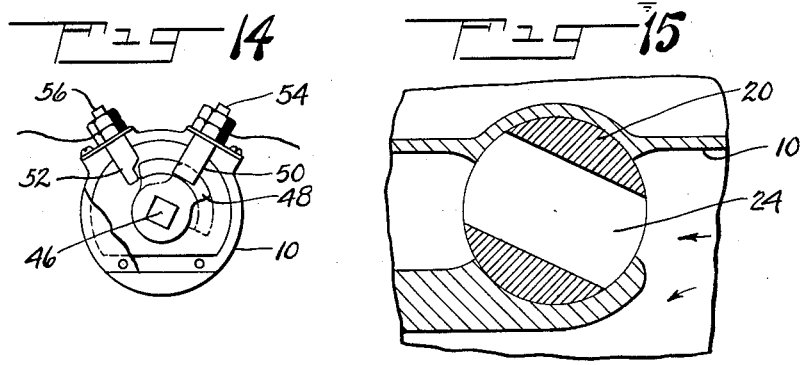
INVENTOR
Arlington Moore
BY J. H. Dyke
ATTORNEY Patented Dec. 16, 1924.

1,519,213

UNITED STATES PATENT OFFICE.

ARLINGTON MOORE, OF NEW YORK, N. Y., ASSIGNOR TO MOORE INVENTIONS CORPORATION, OF WORCESTER, MASSACHUSETTS, A CORPORATION OF MASSACHUSETTS.

COMPRESSED GASEOUS-FLUID BRAKE.

Application filed May 9, 1922. Serial No. 559,675.

*To all whom it may concern:*

Be it known that I, ARLINGTON MOORE, a citizen of the United States, and a resident of New York, county of New York, and State of New York, have invented a certain new and useful Improvement in Compressed Gaseous-Fluid Brakes, of which the following is a specification.

My invention relates to a compressed gaseous fluid brake for automotive devices, such as motor vehicles and the like, propelled by internal combustion motors.

According to the present invention the braking is effected by temporarily converting the internal combustion motor of the automotive device into a gaseous fluid compressor, working against the pressure of compressed fluid, and thereby braking the vehicle by reversal of stresses through the mechanism ordinarily used for propelling the vehicle. The braking effect so obtained while enormously powerful is capable of being gently applied and readily controlled, and provision is made for limiting the pressure of compressed fluid to a predetermined maximum whereby injury to the motor and vehicle cannot be caused, even upon sudden application of the brake.

Provision is also made to prevent injury to the exhaust pipe or muffler by automatically venting same at such times as there is a possibility of explosions of combustible gases occurring therein.

The valve for venting the exhaust pipe is preferably so arranged that it may also be used to serve as an ordinary cut-out valve when desired.

Other features of the invention will be referred to in the following specification.

An embodiment of the invention is illustrated in the accompanying drawings in which Fig. 1 is a side view with parts broken away of an automobile equipped with gaseous fluid compression brake apparatus embodying my invention. Fig. 2 is a cross-sectional view showing a preferred location of the valve operating pedal. Fig. 3 is a side view with parts broken away of the brake casing with the relief valve slightly opened, and the parts in position occupied immediately after the beginning of the releasing movement of the operating pedal. Fig. 4 is a view similar to Fig. 3 with the parts in the position occupied immediately prior to the closing of the flapper valve. Fig. 5 is an end view of the valve casing and associated parts looking from the right of Fig. 4. Fig. 6 is a bottom plan view of the flapper relief valve. Fig. 7 is a longitudinal cross-sectional view showing both the rotary valve and flapper valve closed in position for braking. Fig. 8 is a cross-sectional view of the rotary valve in its seat showing how the valve is held tightly closed by the pressure of the gases, even though loose in its seat. Fig. 9 is a view similar to Figs. 3 and 4 showing the position of the parts when the device is not in use for braking purposes. Fig. 10 is a vertical longitudinal sectional view of Fig. 9. Fig. 11 is a cross-sectional view taken on the line 11—11 of Fig. 9, looking in the direction of the arrows and showing the automatic ignition switch. Fig. 12 is an elevational view similar to Fig. 9, but showing the opposite side of the casing. Fig. 13 is a diagrammatical view of the automatic ignition switch and wiring. Figs. 14 and 15 are views showing corresponding positions of related parts, Fig. 14 being an end view of the ignition switch with the parts in an intermediate position and Fig. 15 being a sectional view of the rotary valve in its seat and in intermediate position corresponding to that of ignition switch of Fig. 14.

Referring to Fig. 1 reference character 10 designates a hollow casing in communication with and forming substantially a portion of the exhaust pipe 12 of the internal combustion motor 14 of the motor vehicle such as an automobile 16, the casing 10 being preferably placed between the motor 14 and the muffler 18. The casing may be inserted in the exhaust conduit in any convenient fashion. In the form shown, the casing is divided horizontally into two parts and secured in place upon the exhaust pipe, after the removal of a section thereof, by clamping the two parts together by means of bolts.

A preferably rotary valve 20 is mounted within the seat 22 in the casing 10. During the normal operation of the motor to drive the vehicle the exhaust gases pass out through the open passage 24 in valve 20, the parts being in the position shown in Fig. 10.

Casing 10 is provided with a lateral passage 26 located between the cut-off valve 20 and the motor 14. Passage 26 is controlled by the relief valve 28 of the flapper type, which is interconnected with rotary valve 20, as will be later explained in detail, but is also preferably adapted to serve as a cut-out valve, as for example, the flapper valve 28, which is normally held closed by the spring 29, may be opened manually by means of a handle or other operating device 30.

The rotary valve 20 is preferably operated by the foot pedal 32, which may be conveniently located adjacent to the clutch pedal C (Fig. 2), and is adapted to be operated by the same foot as is used for the clutch pedal. This location for pedal 32 is preferred, as the clutch actuated by clutch pedal C should not be disengaged when the motor is used as a compression brake.

As shown, valve 20 has a crank arm 34 secured thereto, which is connected by a link 36 to the pedal lever 32. A spring 38 is secured to the pedal 32, as shown in Fig. 1, and must be overcome by pressure on the pedal in order to move the rotary valve 20 to or toward its closed position from its normally open position shown in Fig. 10. The nose or cam 40 on the end of crank 34 limits the movement of valve 20 in opposite directions by engagement with the stop pins 42 and 44.

Means are provided whereby rotation of valve 20 serves automatically to turn the ignition current off and on. In the form shown, the shaft 46 of valve 20 carries a switch arm 48 adapted during rotation of the valve 20 to be brought into and out of engagement with the switch jaws 50, 52. When in contact with both of the switch jaws 50 and 52 the terminals 54 and 56 (Fig. 14) are bridged, so that the ignition current passes, and at other times the ignition current is cut off, as will be readily understood. Corresponding positions of the switch arm 48 and rotary valve 20 are shown in Figs. 14 and 15. The valve 20 and switch arm 48 being fastened together always rotate in the same direction, and it will be seen that, with the arrangement shown, upon closing the valve 20 the ignition is cut off before the valve 20 is closed, and upon opening the valve 20 the same has been opened to a material extent before the ignition current is permitted to pass. When valve 20 is closed to obtain compression of the gases, the pressure holds it to its seat as shown in Fig. 8, so that even if it is initially made, or later becomes loose or worn in its seat, leaving a clearance 25 as shown in said Fig. 8, the valve 20 operates as well as a close fitting valve.

Sufficient braking effect can readily be secured by a very moderate degree of compression in the motor exhaust pipe 12. Means are preferably provided for limiting the pressure to a predetermined amount.

In the form shown, the flapper valve 28 is utilized for this purpose, being normally held closed by the spring 29, which is preferably mounted so that adjustable tension may be applied thereto. As shown, the spring 29 has a stem 58 secured thereto and the desired adjustment is obtained by means of nuts 60, 62. The adjustment of spring 29 is preferably such that the compressed gases are permitted to escape by yielding of the spring 29 and the consequent opening of the valve 28 at a pressure somewhat lower than that which would be requisite to open the exhaust valves of the internal combustion motor against their valve springs.

The unignited, usually combustible, charges which pass through the motor during the braking operation while the ignition is cut off may possibly in some instances be exploded in the exhaust pipe at the time the braking operation is discontinued, and the use of the motor for driving the vehicle is resumed at which time the ignition circuit is closed. In order to guard against any injury to the exhaust pipe or muffler by explosion of such charges therein, provision is made for automatically opening the flapper valve 28 momentarily at about the time the ignition circuit is closed. In the form shown, the flapper valve 28 is provided with a laterally projecting lug 64, which is adapted to be engaged by the roller 66 of the lever 67 pivoted at 68 to the casing 10, and said lever 67 is provided with a roller 70 at its opposite end, which is interposed in the path of the nose or cam 40 of crank arm 34. Three positions of the parts referred to are illustrated in Figs. 3, 4 and 9. Fig. 9 illustrates the position of the parts in normal position when the motor is driving the vehicle, valve 20 being in the position shown in Fig. 10. Fig. 4 shows how the nose 40 engages the roller 70 of lever 67 to open the flapper valve 28 at the time when the ignition circuit is closed after the device is made use of for braking, and Fig. 3 shows the flapper valve slightly opened and the parts in position at the beginning of the releasing movement of the operating pedal, the link 36 travelling in the direction indicated by the arrow on Fig. 3.

It will be seen that on turning crank arm 34 to close valve 20, the nose 40 acts to turn the lever 67 in a clockwise direction, as viewed in Fig. 9, spring 71 yielding to permit this movement and to permit roller 66 to move away from lug 64. As the crank arm 34 is moved further in the direction of the arrow on Fig. 9 the nose 40 rides over the roller 70 after momentarily engaging same, whereupon spring 71 is retracted bringing roller 66 of lever 67 again into engagement with the lug 64 of flapper valve 28, but as spring 29 is much stronger than spring 71 the flapper valve remains closed.

When the pedal 32 is released the parts occupy successively the positions of Figs. 3 and 4, and roller 70 being on the opposite side of nose 40 of crank arm 34, flapper valve 28 is opened, spring 38 overcomes the resistance of spring 29. Upon a slight further return movement of link 36 in the direction of the arrow on Fig. 4, nose 40 passes roller 70 and valve 28 and roller 67 are brought by spring 29 into the position shown in Fig. 9.

When the flapper valve 28 is operated, as by means of the handle 30, to serve as a cutout, it will return after being released so that the lug 64 thereon again comes into engagement with the roller 68 of lever 67, as will be apparent from the showing of Figs. 4 and 9. At such times the movement of lever 67 is limited by contact of roller 70 with the stop 73.

The operation of the apparatus will be readily understood from the foregoing. To use the device as a brake, the pedal 32 is depressed closing valve 20 and breaking the ignition circuit. The motor is thus converted temporarily into a fluid compressor serving to compress the fluid admitted to the cylinders which is ordinarily the explosive mixture supplied by the carburetor, but may be air or other gaseous fluid. As soon as the pressure thus created is sufficient to overcome the tension of valve opening 29, valve 28 opens slightly and permits the escape of excess gases beyond what is necessary to maintain the pressure at the predetermined figure for which the adjustable spring 29 is set. The motor working as a compressor against the predetermined pressure serves through the elements normally used for driving the vehicle, to retard the same and to act as a brake to the vehicle movement, the clutch remaining in engagement, as the foot of the operator used to operate the clutch is being used to work pedal 32. When it is desired to resume the driving actuation of the motor, pedal 32 is released, thereby opening valve 20 and closing the ignition circuit. At or immediately prior to the instant when the ignition circuit is closed the flapper valve 28 is opened in the manner described, so that if combustible gases should explode in the exhaust pipe they will be vented by means of the open flapper valve 28, and no harm will result. The operation is completely automatic and requires no attention whatever beyond the application of a slight amount of foot pressure to the pedal 32, and subsequent release thereof. When only a relatively slight braking effect is desired, pedal 32 is pushed down part way until the desired effect is secured. Valve 20 under such conditions need not be entirely closed, a partial closing thereof being sufficient to give the desired effect as soon as the ignition circuit is broken by switch arm 48.

It is understood that the embodiment of the invention herein disclosed is intended only for illustration and affording an understanding of the invention, and not for limitation of the invention, which is of the scope defined in my claims.

I claim:

1. A self-contained device for converting into a fluid compression brake an internal combustion motor, comprising a housing forming a portion of the exhaust conduit, and a cut-off valve and a vent valve located in said housing.

2. A housing adapted to replace a portion of an internal combustion engine exhaust conduit, and a shut-off valve and a vent valve in said housing.

3. In a device of the class described, an exhaust conduit cut-off valve, means to open and close same, a vent valve, and means interconnected with the cut-off valve operating means for opening and closing the vent valve.

4. In a device of the class described, a vehicle internal combustion engine motor with an exhaust conduit, a cut-off valve in the conduit, and a vent valve adapted when opened to freely vent the conduit between the cut-off valve and the engine.

5. In a device of the class described, a housing adapted to replace a part of the exhaust conduit of a vehicle internal combustion engine and having self-contained therein a cut-off valve, a conduit vent valve, and an engine ignition switch.

6. In a device of the class described, a housing adapted to replace a part of the exhaust conduit of a vehicle internal combustion engine and having self-contained therein a cut-off valve, a conduit vent valve, an engine ignition switch, and interconnected means for operating said valves and switch.

7. In apparatus for converting into a gaseous fluid compression brake an internal combustion motor comprising an exhaust conduit and an ignition circuit, the combination of a valve for closing the exhaust conduit, and a spring closed vent valve between the first named valve and the motor.

8. In apparatus for converting into a gaseous fluid compression brake an internal combustion motor comprising an exhaust conduit and an ignition circuit, the combination of a valve for closing the exhaust conduit, a spring closed vent valve between the first named valve and the motor, and means for adjusting the tension on the valve spring.

9. In apparatus for converting into a gaseous fluid compression brake an internal combustion motor comprising an exhaust conduit and an ignition circuit, the combination of a valve for closing the exhaust conduit, a spring closed vent valve between the first named valve and the motor, and means for breaking the ignition circuit when the first named valve is closed and closing the ignition circuit when said valve is opened.

10. Apparatus for converting into a fluid compression brake an internal combustion motor comprising an exhaust conduit and an ignition circuit, said apparatus comprising two valves in said conduit, one valve serving to close the conduit and the other a vent valve located between the first named valve and the engine and opening outwardly, and a spring for holding the vent valve in closed position.

11. Apparatus for converging into a fluid compression brake an internal combustion motor comprising an exhaust conduit and an ignition circuit, said apparatus comprising a rotary shut-off valve in the exhaust conduit and an outwardly opening spring closed flapper valve for said conduit located between the shut-off valve and the engine.

12. In apparatus for converting into a fluid compression brake an internal combustion engine comprising an exhaust conduit and an ignition circuit, a shut-off valve for the exhaust conduit, a vent valve between the cut-off valve and the motor, movable means with said valve for breaking and closing the ignition circuit as said cut-off valve is closed and opened respectively, and means whereby the vent valve is opened as the cut-off valve is being opened.

13. In apparatus for converting into a fluid compression brake an internal combustion motor comprising an exhaust conduit and an ignition circuit, a cut-off valve for said conduit, means for opening and closing said valve, means connected with said valve for breaking and closing the ignition circuit, a spring closed vent valve in said conduit between the first named valve and the engine, and means operated from said first named valve for momentarily opening said vent valve against its spring as the first named valve is being opened and the ignition circuit closed.

14. In apparatus for converting into a fluid compression brake an internal combustion motor comprising an exhaust conduit and an ignition circuit, a rotary valve adapted upon rotation to close and open the exhaust conduit, means for breaking and closing the ignition circuit upon rotation of said valve, a vent valve for said conduit normally spring held closed, and means interconnected with the operating means for the rotary valve for temporarily opening said vent valve against its spring as the rotary valve is being turned into the open position.

15. The combination with an automotive device and its internal combustion motor comprising an exhaust conduit and an ignition circuit of a valve casing inserted in said exhaust conduit and forming a continuation thereof, a rotary cut-off valve and a spring held closed vent valve in said casing, the last named valve being placed between the cut-off valve and the motor, an ignition switch arranged to be operated upon rotation of the cut-off valve, a lever for operating said vent valve, and means for actuating said lever upon rotation of the rotary cut-off valve to open the vent valve momentarily as the rotary valve is being opened and the ignition switch closed.

16. A hollow valve casing adapted to be inserted in the exhaust conduit of an internal combustion motor with its hollow interior forming a continuation of said conduit, a cut-off valve and an outwardly opening vent valve in said casing, the vent valve being located between the cut-off valve and the motor, and a spring for holding said vent valve closed.

In testimony whereof, I have signed my name hereto.

ARLINGTON MOORE.